M. A. TERRY.
ACCELERATOR PEDAL.
APPLICATION FILED FEB. 2, 1917.
1,233,525.
Patented July 17, 1917.
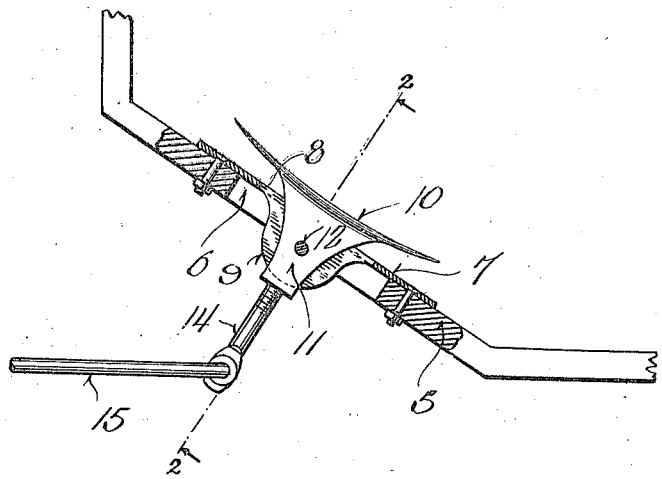
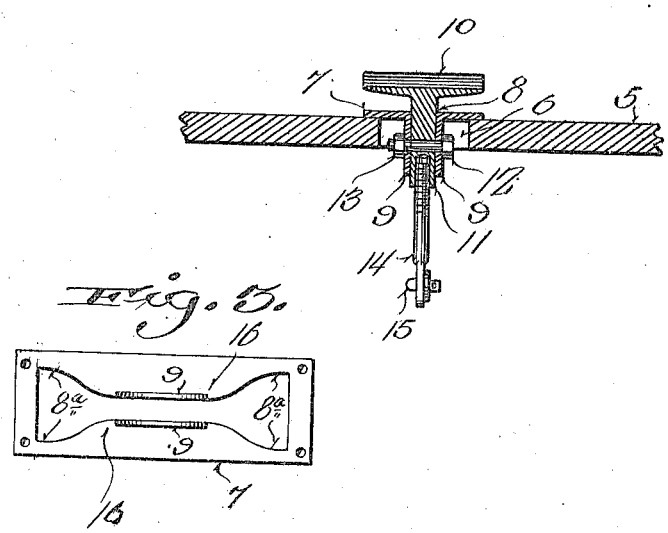

UNITED STATES PATENT OFFICE.

MICHAEL A. TERRY, OF MILWAUKEE, WISCONSIN, ASSIGNOR OF ONE-HALF TO JULIUS ZOTTER, OF MILWAUKEE, WISCONSIN.

ACCELERATOR-PEDAL.

1,233,525.

Specification of Letters Patent.

Patented July 17, 1917.

Application filed February 2, 1917. Serial No. 146,050.

*To all whom it may concern:*

Be it known that I, MICHAEL A. TERRY, a citizen of the United States, and resident of Milwaukee, in the county of Milwaukee and State of Wisconsin, have invented certain new and useful Improvements in Accelerator-Pedals; and I do hereby declare that the following is a full, clear, and exact description thereof.

The present invention relates to new and useful Improvements in accelerator pedals for automobiles. The accelerator pedals of automobiles are usually held in in-operative position by a suitable spring means, and thus in the operation of the accelerators, the driver's foot must be continuously pressed thereon, to hold it in active position.

This arrangement constitutes a considerable inconvenience, in that it may be often desired to utilize the foot for actuation of the brake, or the like, and it is therefore primarily the object of the present invention, to provide an arrangement whereby the accelerator pedal is held against releasing movement upon actuation, thus permitting removal of the driver's foot, and retaining the accelerator active until the pedal is manually moved to in-operative position.

More specifically, it is an object to provide a frictional means for holding the pedal in desired positions, to thus provide for a most convenient operation of the pedal. A further object resides in the provision of a frictionally held accelerator pedal and mounting, which is of an exceedingly simple and durable nature.

With the above and other objects and advantages in view, the invention resides more particularly in the novel combination, formation and arrangement of parts hereinafter mentioned and pointed out in the appended claims.

In the drawings:

Figure 1 is a vertical sectional view through an accelerator pedal constructed in accordance with the present invention.

Fig. 2 is a transverse sectional view through the pedal on the line 2—2 of Fig. 1.

Fig. 3 is a plan view of a slightly modified form of attaching plate.

Referring more particularly to the accompanying drawings, 5 designates the flooring of an automobile, which is provided with an aperture 6 and fitted over this aperture and secured to the flooring is an attaching plate 7, which is provided with a longitudinal slot 8, provided with ears at its side depending through the aperture 6 of the flooring. The accelerator pedal plate 10 is provided on its bottom face, with an ear 11, which is of such width as to frictionally fit within the slot 8 and between the ears 9. Passed through the ears 9 and 9 is is a pivot bolt 12, having a nut 13 threaded thereon.

The ear 11 extends below the ears 9 and is socketed to threadedly receive one end of a bar 14, to the lower portion of which is pivoted a link 15, extending in the usual manner to the carbureter. The function of holding the pedal plate 10 in desired pivotal positions, is effected in the present structure by the relatively great size of the ears 9, which present large flat friction surfaces, to the relatively large ear 11 of the pedal, and the frictional engagement setup is sufficient to hold the pedal against undesired movement, yet permits ready manipulation of the pedal by the driver's foot. In as much as the ears 9 are preferably formed of malleable iron or other material which is somewhat flexible, tightening of the nut 13 of the pivot bolt affords some adjustment of the frictional engagement of the ears; although it will be appreciated that in some instances, it may be desirable to utilize resilient means for frictionally engaging the ear of the pedal. For instance, the ears 9, instead of being formed of malleable iron, may have a spring tendency.

By providing the bar 14, threadedly engaged in the ear 11 of the pedal, the operation of the accelerator may be varied by extending or retracting said bar, with respect to the ear, by reason of its threaded engagement.

It is in some instances desired to extend the frictional ears 9 upwardly and this arrangement can obviously be effected by merely inverting the carrying plate 7. More particularly in connection with the upwardly extending disposition of these ears, the structure shown in Fig. 3 provides for an increased gripping actuation thereof with respect to the pedal ear 11, and in this structure the opening 8 is extended past the ears 9 to form taperingly widened enlargements 8ª thereof, and these enlargements define ear carrying tongue portions 16 which have suitable resiliency whereby the pressure of the operator's foot upon the pedal will bow said tongue portions outwardly to consequently urge the ears 9 inwardly for a greater degree of frictional engagement with the pedal carried tongue 12.

What is claimed is:—

1. An accelerator pedal structure comprising a longitudinally slotted attaching plate, lateral ears at the sides of the slot of said plate, a pedal plate, a lateral ear on said plate frictionally engageable between the first named ears and provided with a socket in its free end, a bar threadedly engaged in said socket and an actuating link pivoted to the bar.

2. An accelerated pedal structure comprising an attaching plate, a pair of parallel spaced ears extending laterally from the intermediate portion thereof, said plate being provided between the ears with an opening having its end portions extended past the ears and relatively widened to define resilient ear carrying tongue portions, a pedal plate and a lateral ear on the pedal plate pivoted between the first named ears and frictionally engaged therewith.

3. An accelerator pedal structure comprising an attaching plate, lateral ears having a spring tendency and extending laterally from the intermediate portion of the plate, a pedal plate, a lateral ear formed integral with the pedal plate and frictionally pivoted between the first named ears, a socket provided in the free end of the pedal ear, and an actuating means engaging the socket.

In testimony that I claim the foregoing I have hereunto set my hand at Milwaukee, in the county of Milwaukee and State of Wisconsin.

MICHAEL A. TERRY.

Copies of this patent may be obtained for five cents each, by addressing the "Commissioner of Patents, Washington, D. C."